Patented Dec. 19, 1933

1,940,589

UNITED STATES PATENT OFFICE 1,940,589

SOLUBLE CELLULOSE ESTERS OF HIGHER FATTY ACIDS

Max Hagedorn and Georg Hingst, Dessau in Anhalt, Germany, assignors to I. G. Farbenindustrie Aktiengesellschaft, Frankfort-on-the-Main, Germany, a corporation of Germany No Drawing. Application December 30, 1927, Serial No. 243,759, and in Germany January 6, 1927

2 Claims. (Cl. 260—101)

The present invention is based on the observation that soluble esters of the higher fatty acids can be made from unaltered cellulose, that is to say a cellulose which has not been pretreated, by heating at a temperature above 100° C. the insoluble esters, which are formed when an unaltered cellulose is treated with a halogenide, preferably a chloride, of a higher fatty acid possessing more than eight carbon atoms in its molecule in presence of an organic base, such as pyridine or quinoline.

For executing the process the insoluble ester, having been prepared, for example, at a temperature lower than 100° C., is treated at a temperature above 100° C. until the desired solubility of the ester has been attained.

After having esterified the cellulose it is advantageous, without isolating the insoluble ester, to heat the mixture at a temperature above 100° C., mostly between 100 and 200° C. With the same result the esterification may be conducted at a temperature above 100°, generally between 100 and 200° C.

For each ester there is a temperature limit below which the esterification leads to an insoluble ester whereas above that temperature a soluble ester is obtained. The temperature limit varies for the individual acids, for instance in the case of lauric acid it is 110° C.; in the case of stearic acid 140° C.; but it does not fall below 100° in the case of any higher fatty acid.

In the indicated operation a diluent may be used, preferably any substance being suitable, which is a solvent for the ester to be obtained.

In order to ensure a smooth course of the reaction it is advantageous to heat the mixture as rapidly as possible. The reaction is finished as soon as no more fibre can be detected in the mixture. This happens generally after 1 to 3 hours. The ester formed is then precipitated from the mixture by means of an alcohol, such as methanol or ethanol, or acetone and washed and dried. According to the proportions used there is obtained in this manner a soluble di- or tri-ester.

The esters thus obtained have solubilities of the cellulose esters which are made by the known process using hydro-cellulose but they have considerably better mechanical properties than the known cellulose esters of the higher fatty acids have.

The following examples without limiting the invention illustrate the process:

Example 1.—100 grams of untreated cellulose are heated with a mixture of 425 grams of lauryl chloride, 240 cc. of technical pyridine and 1250 cc. of chlorobenzene for 12 to 20 hours at 80–100° C. There is produced a thick magma which contains the insoluble cellulose-di-laurate. The temperature is now raised until the chlorobenzene boils violently (135–140° C.) and the heating is continued until the insoluble cellulose-di-laurate has become a soluble ester. As soon as the desired solubility has been attained the mixture is poured into ethanol whereby the ester is precipitated. It is filtered, washed and dried. This cellulose-di-laurate dissolves in aromatic hydrocarbons and chlorinated aliphatic hydrocarbons.

Example 2.—Into a mixture of 4 litres of xylol and 960 grams of stearyl chloride, previously heated to 135–140° C., there are introduced 800 cc. of pyridine and 160 grams of untreated cellulose. Whilst stirring well the temperature is raised to 140–150° C. After 1½ to 2 hours no more fibres can be detected in the mixture. The mass is then poured into alcohol and the ester thus precipitated is filtered, washed and dried. There is obtained a soluble cellulose-di-stearate which is soluble in particular in aromatic hydrocarbons and in chlorinated hydrocarbons.

The organic base used in the foregoing examples is applied in an amount not surpassing substantially the equivalent of the chloride of the higher fatty acid used in the examples.

In the following claims the term "higher fatty acids" is to be understood as the acids having more than eight carbon atoms in the molecule.

What is claimed is:

1. Process of producing cellulose esters of lauric acid being soluble in aromatic hydrocarbons and chlorinated hydrocarbons, which process comprises acting upon unaltered cellulose at a temperature below 110° C. with lauric chloride in presence of an organic base in an amount not surpassing substantially the equivalent of the lauric chloride applied and of a diluent, and heating the ester thus formed to a temperature above 110° C.

2. Process of producing cellulose esters of lauric acid being soluble in aromatic hydrocarbons and chlorinated hydrocarbons, which process comprises acting upon unaltered cellulose at a temperature below 110° with lauric chloride in presence of an organic base in an amount not surpassing substantially the equivalent of the lauric chloride applied and of a diluent, and heating the reaction mixture to a temperature above 110° C.

MAX HAGEDORN.
GEORG HINGST.